April 1, 1947.  R. J. MILLER  2,418,362
FLUID TORQUE CONVERTER
Filed July 26, 1943  3 Sheets-Sheet 1

INVENTOR.
RAYMOND J. MILLER
BY
O. H. Fowler
ATTORNEY.

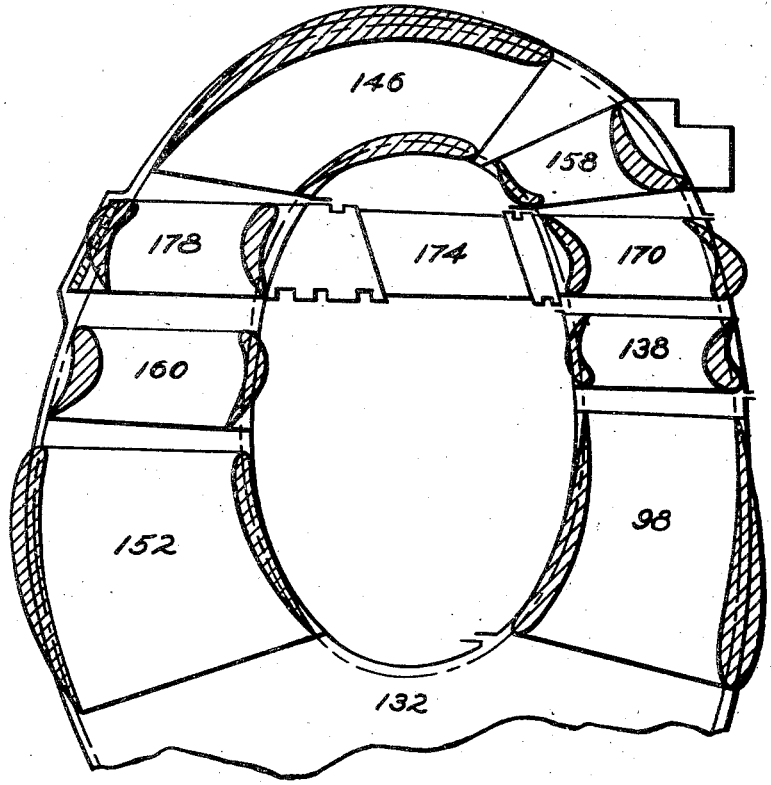
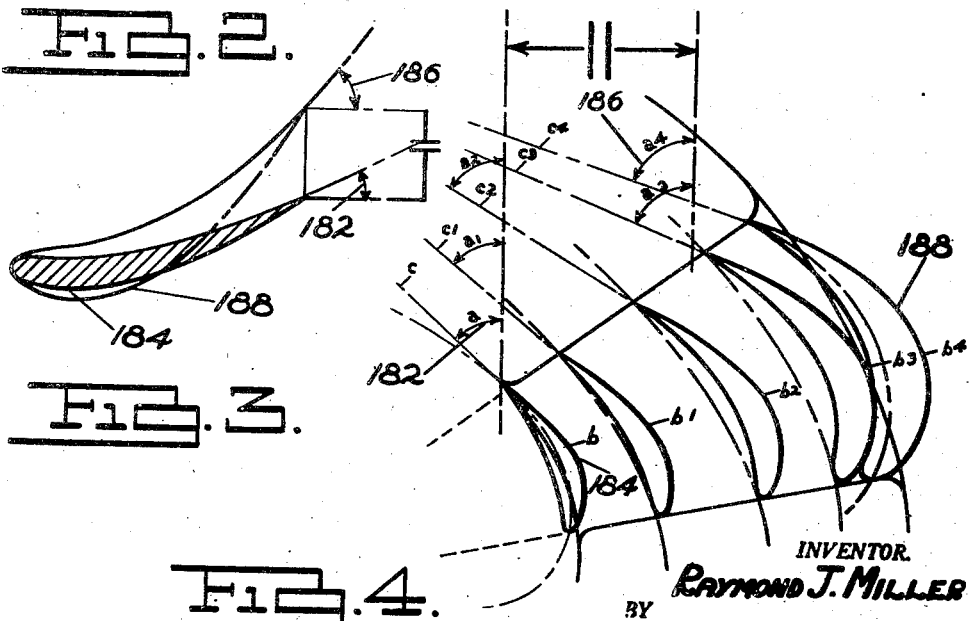

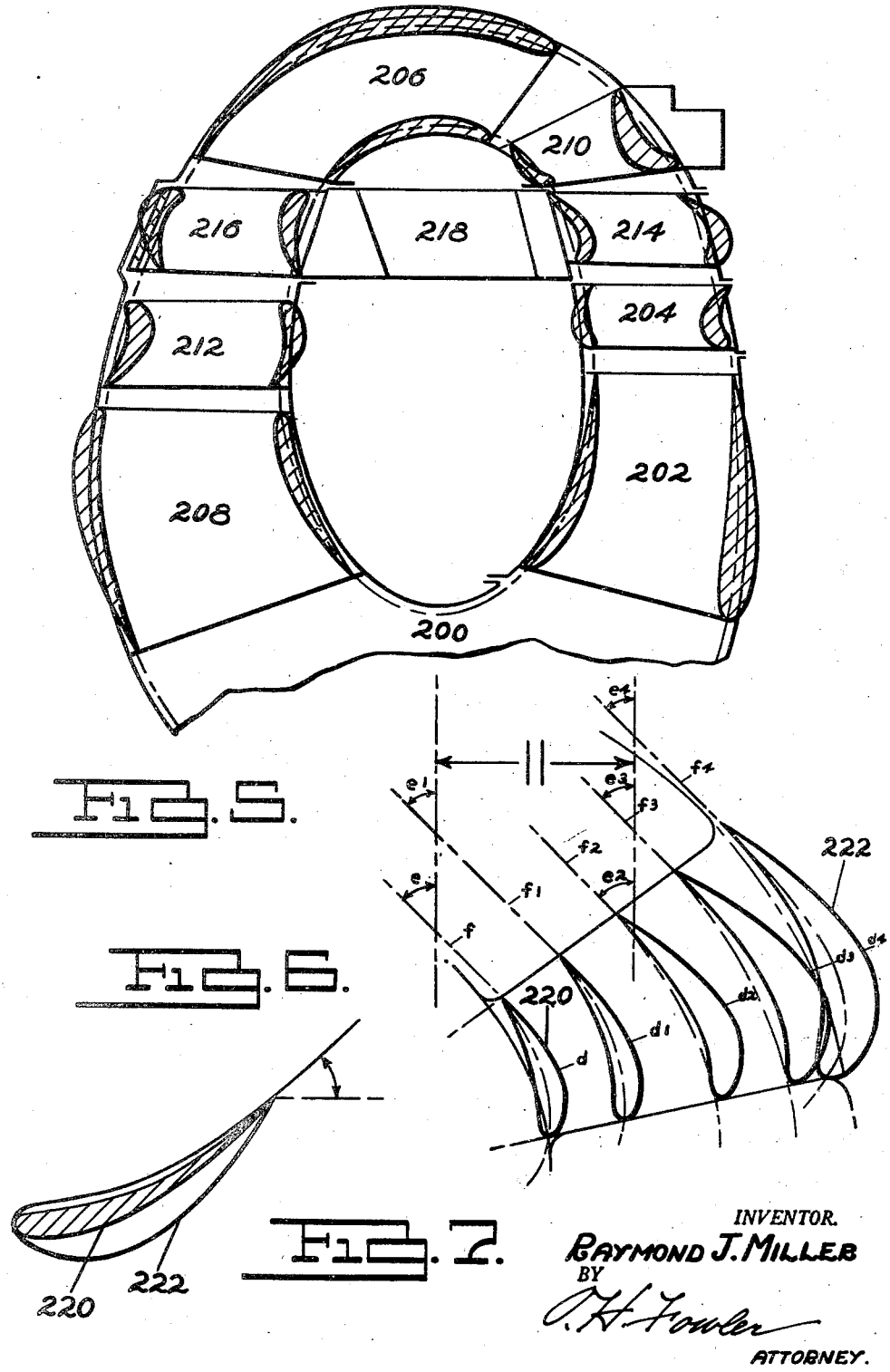

Patented Apr. 1, 1947

2,418,362

UNITED STATES PATENT OFFICE 2,418,362

FLUID TORQUE CONVERTER

Raymond J. Miller, Detroit, Mich., assignor to Hydraulic Brake Company, Detroit, Mich., a corporation of California Application July 26, 1943, Serial No. 496,195

5 Claims. (Cl. 60—54)

This invention relates to transmissions, and more particularly to that type known as fluid drives.

Broadly the invention comprehends a torque converter of the type having a toroidal channel of uniform cross-sectional area and vaned members in the channel for cooperation with one another characterized in that the vanes are each of a particular structure providing for positive fluid flow lines effective for insuring the maximum efficiency.

An object of the invention is to provide a blade wheel having vanes of definite structure and characteristics.

Another object of the invention is to provide a blade wheel having equi-spaced vanes each of a particular structure developed to insure positive fluid flow lines.

Other objects and advantages of the invention will appear from the following description taken in connection with the drawings forming a part of this specification, and in which—

Fig. 2 is a diagrammatical view of the vortex chamber and the vanes arranged therein;

Fig. 3 is a side elevation of one type of blade;

Fig. 4 is a diagrammatical illustration of the vane for the attainment of pre-selected flow lines;

Fig. 5 is a diagrammatical view of a vortex chamber having arranged therein vanes of a modified form;

Fig. 6 is a diagrammatical illustration of the modified vane and flow lines attained thereby; and Fig. 7 is a side elevation of the modified vane.

Figure 1:
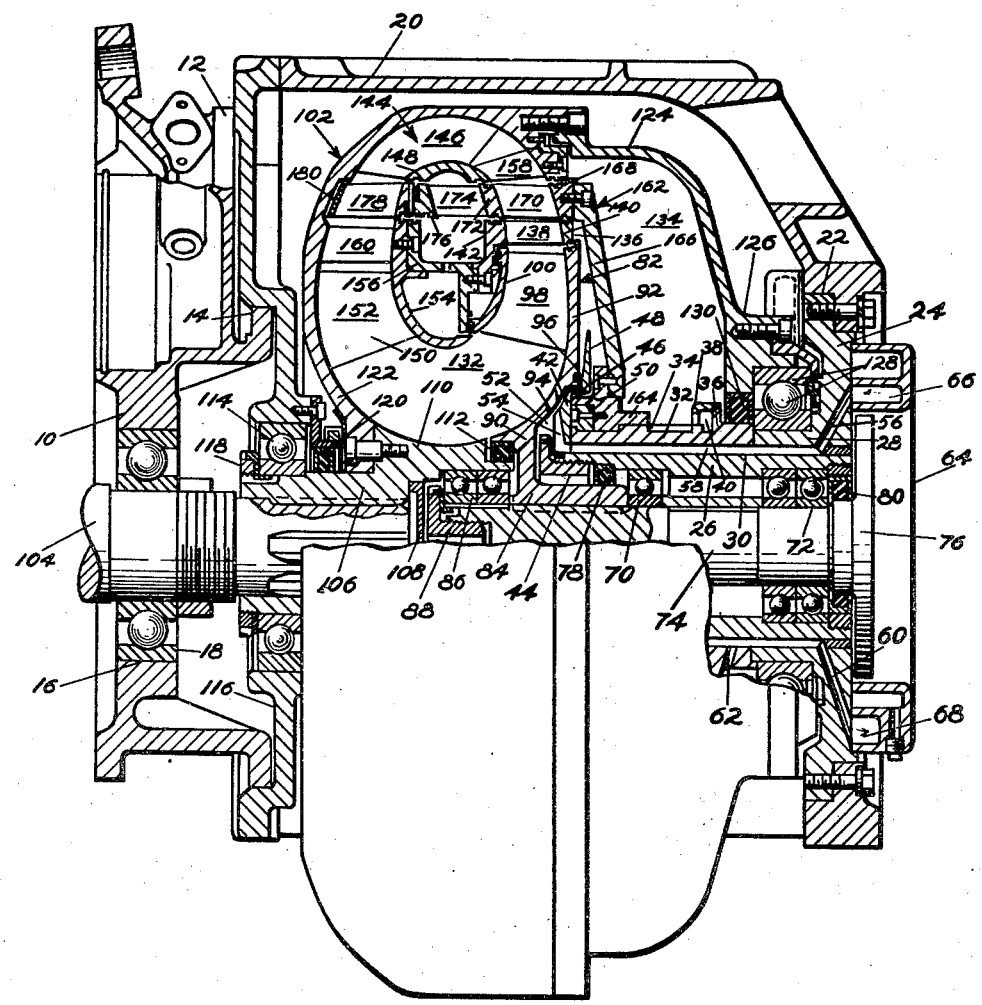
Fig. 1 is a view in side elevation and partly in section of a fluid torque converter embodying the invention.

Referring to the drawings for more specific details of the invention, 10 represents the end plate of a conventional transmission case having a flange 12 provided with a shoulder 14 and an opening 16 supporting a bearing 18. A housing 20 suitably secured to the transmission case has an opening 22 concentrically disposed with relation to the opening 16, and also suitable air inlet and outlet openings.

A closure plate 24 fitted in the opening 22 and suitably secured against displacement, as by bolts, rigidly supports a sleeve 26 extended concentrically within the housing 20. The sleeve 26 has a heavy portion 28 and a reduced portion 30, and the latter supports a sleeve 32 abutting the heavy portion, and the sleeve 32 has threads 34 and a circumferential flange 36 supporting a ring 38 providing in conjunction with the sleeve 32 and the flange 36 an annular chamber 40, the purpose of which will hereinafter appear.

A ring 42 clamped to the free ends of the sleeves 26 and 32 by a retainer 44 threaded in the sleeve 26 has an axial flange 46 terminating in a radially extended flange 48. The flange 46 in conjunction with the ring 42 and sleeve 32 provides an annular chamber 50 arranged in oppositely disposed relation to the annular chamber 40. The radially extended flange 48 provides a wall portion of a balancing chamber 52, and the ring 42 is bored to provide a plurality of spaced passages 54 in direct communication with the balancing chamber.

The closure plate 24 is bored to provide a group of spaced passages 56 communicating with the spaced passages 54 in the ring 42 by way of passages 58 extended through the sleeve 26, and also a group of spaced passages 60 terminating in ports 62 in the body of the sleeve 32, and a manifold 64 suitably secured to the closure plate 24 has separate channels 66 and 68 communicating with the passages 58 and 60 respectively. The channel 66 is suitably connected to the outlet of a reservoir, not shown, and the channel 68 is connected to the inlet of the reservoir.

The stationary sleeve 26 has fitted therein spaced bearings 70 and 72 supporting a driving shaft 74, adapted to be connected as by a flange 76 to a power plant or an internal combustion engine, and sleeved on the shaft adjacent the bearings are suitable sealing rings 78 and 80 for inhibiting seepage of lubricant from the bearings and also fluid from the torque converter to be hereinafter described.

An impeller indicated generally at 82 includes a hub 84 splined to the driving shaft 74 and held against displacement as by bearings 86 sleeved on the shaft and secured against displacement by a retaining ring 88 threaded in the free end of the shaft. The hub 84 has a web 90 supporting an outer shroud 92. The web and shroud in conjunction with the ring 42 complete the balancing chamber 52, and the shroud has an opening 94 therethrough communicating with the balancing chamber, and arranged on the back of the shroud is a part of a labyrinth seal 96 complementary to the remaining part of the seal on the flange 48 and operative to effectively seal the balancing chamber. The shroud 92 has arranged thereon a plurality of equi-spaced impeller blades 98 supporting an inner shroud 100. The particular structure of the blades 98 will be hereinafter fully described.

A turbine indicated generally at 102 is secured to a driven shaft 104 supported for rotation on the bearing 18 in the end plate 10 of the transmission case in axial alignment with the driving shaft. The turbine includes a hub 106 splined to the driven shaft 104 and held against displacement by a retaining nut 108. The hub has a flange 110 for the reception of the bearings 86 on the driving shaft 74, and interposed between the flange 110 and the web 90 of the impeller is a fluid seal 112. The hub also receives a bearing 114 supported on an end plate 116 of the housing 20 and held against displacement as by a retaining ring 118 threaded on the hub, and a seal 120 secured to the end plate 116 adjacent the bearing 114 has a wiping engagement with the driven shaft.

The hub 106 has thereon an outer shroud 122 having bolted or otherwise secured thereto a housing section 124 having a bearing support 126 for the reception of a bearing 128 sleeved on the shank 28 of the stationary sleeve 26, and a fluid seal 130 having a wiping engagement with the threaded sleeve 32 supported on the sleeve 26. The outer shroud 122 of the turbine and the housing section 124 secured thereto provide in conjunction with the outer shroud 92 of the impeller a vortex chamber 132 of the uniform channel type disclosed in my co-pending application for improvements in Fluid torque converters, filed October 8, 1942, Serial No. 461,351, and an auxiliary fluid chamber 134, the latter communicating by way of the ports 62, the passages 60 and the channel 68 of the manifold 64 with the inlet of the reservoir for the return of fluid thereto.

As shown, the turbine 102 is of the three-stage type. The first stage 136 at the discharge of the impeller includes a plurality of vanes 138 mounted in spaced relation to one another on an outer shroud 140 and secured to an inner shroud section 142. The second stage 144 includes a plurality of vanes 146 arranged on the outer shroud 122 and secured to an inner shroud 148, and the third stage 150 includes a plurality of spaced vanes 152 also mounted on the outer shroud 122 and secured to an inner shroud section 154 attached as by a ring 156 to the shroud section 142. The turbine also has two sets of rectifying vanes 158 and 160. The rectifying vanes 158 are forward of the second stage 144 of the turbine and serve to direct the flow of fluid to the vanes 146 of the second stage, and the rectifying vanes 160 are forward of the third stage 150 of the turbine and serve to direct the flow of fluid to the vanes 152 thereof. The vanes and the rectifying vanes of the turbine are of a particular structure to be hereinafter fully described.

A reaction member 162 for cooperation with the impeller and turbine includes a carrier 164 mounted for travel on the threaded sleeve 32 fitted on and secured to the stationary sleeve 28. The ends of the carrier are adapted to be received by the annular chambers 40 and 50, respectively, to absorb shock in both directions of movement. The carrier 164 has thereon a web 166 supporting a shroud section 168 having arranged thereon a plurality of spaced reaction vanes 170 movable into and out of the fluid channel between the vanes 138 of the first stage of the turbine and the rectifying vanes 158. The reaction vanes 170 support an inner shroud 172 having arranged thereon spaced overdrive vanes 174 adapted to move into the fluid channel when the reaction vanes 170 move out of the channel, and vice versa. The overdrive vanes 174 support a shroud section 176 having arranged thereon spaced reaction vanes 178 movable concomitantly with the reaction vanes 170 into and out of the fluid channel between the vanes 146 of the second stage of the turbine and the rectifying vanes 160, and the reaction vanes support an outer shroud 180.

As hereinabove stated, the vortex chamber 132 is of the type disclosed in my co-pending application wherein the cross-sectional area of the toroidal circuit is uniform throughout. In other words, the toroidal circuit is characterized in that the fluid in the circuit has the same infinite volume at any annular cross-section of the circuit.

Having such a fluid circuit in mind, and being desirous of improving the same, it has been found that by pre-selecting the fluid flow lines maximum efficiency may be attained. The pre-selected fluid flow lines may be had by a careful selection of a vane having certain characteristics. Such a vane is illustrated in Figs. 3 and 4, wherein a vane of streamline character has one of its side edges presenting a low pitch angle 182 and a low lift 184 and its other side edge has a relatively high pitch angle 186 and a high lift 188. The pitch angle varies across the vane as is most clearly shown at $a$, $a^1$, $a^2$, $a^3$, and $a^4$, and the lift also varies across the vane as indicated at $b$, $b^1$, $b^2$, $b^3$, and $b^4$. By the introduction of vanes of the character hereinabove described in a vortex chamber of the type having a uniform cross-sectional area, the flow lines would be substantially as indicated at $c$, $c^1$, $c^2$, $c^3$ and $c^4$ and such flow lines have been proved to provide the maximum efficiency.

In normal operation, rotation of the impeller 82 by force transmitted through the driving shaft 74 results in energization of the fluid in the vortex chamber 132, and the energy of the fluid is absorbed by the vanes 138, 146 and 152 of the turbine, also on the rectifying vanes 158 and 160 of the turbine and the reaction vanes 170 and 178 of the reaction member, resulting in rotation of the turbine and the consequent transmission of force through the driven shaft 104.

Upon attaining a predetermined speed of rotation of the impeller and associated turbine, the flow of fluid in the vortex chamber changes, and the fluid impinges on the backs of the reaction vanes 170 and 178. This results in automatic movement of the reaction member 162 on the threaded sleeve 32 secured to the stationary sleeve 26, and as the reaction member 162 travels on the threaded sleeve, the reaction vanes 170 and 178 are moved out of the fluid flow in the toroidal channel and the overdrive vanes are moved into the channel. Toward the end of this movement, the carrier 164 is received by the annular chamber 40, and this serves to absorb the shock as it assumes its fully retracted position. Upon completing this operation, the unit functions as a fluid coupling.

When operating the unit as a fluid coupling, should a demand for increase in torque occur, the direction of the fluid flow in the vortex channel again changes and the fluid in the channel impinges on the face of the overdrive vanes 174, and this results in travel of the reaction member 162 on the threaded sleeve 32. During this travel of the reaction member, the overdrive vanes 174 are moved out of the channel and the reaction vanes 170 and 178 are moved into the channel.

Toward the end of this operation, the carrier 164 is received by the annular chamber 50, and this serves to absorb shock as the reaction member moves to a position where the reaction vanes 170 and 178 are fully within the channel, in which position the reaction member is held against movement.

In Fig. 5 a vortex chamber 200 of the type having a uniform cross-sectional area has therein impeller blades 202, first, second, and third stage turbine vanes 204, 206, and 208, rectifying vanes 210 at the entrance of the second stage of the turbine, also rectifying vanes 212 at the entrance of the third stage of the turbine, reaction vanes 214 and 216 between the vanes 204 of the first stage of the turbine and the rectifying vanes 210, and between the vanes 206 of the second stage of the turbine and the rectifying vanes 212, and also overdrive vanes 218 adapted to move into the channel as the reaction vanes move out of the channel. The structure is identical to that of the preferred embodiment with the exception of the structure of the vanes.

In this embodiment of the invention, each vane is of streamline character with a low lift 220 at one edge and a relatively high lift 222 at its opposite edge. The lift varies as indicated at $d, d^1, d^2, d^3$, and $d^4$, and the pitch remains constant as indicated at $e, e^1, e^2, e^3$ and $e^4$, and, accordingly, the flow lines would be maintained substantially as indicated at $f, f^1, f^2, f^3$ and $f^4$ wherein a high degree of efficiency is attained.

The operation is identical to that of the preferred embodiment, and hence need not be repeated.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A blade wheel comprising inner and outer shrouds each curved in the direction of flow through the wheel, spaced vanes between the shrouds each curved in a direction extending from one shroud to the other and having a streamline contour and a graduated thickness increasing from the inner shroud to the outer shroud providing a low lift at the inner shroud and a high lift at the outer shroud, and a constant pitch angle.

2. A blade wheel for a fluid transmission of the type having a toroidal channel including spaced inner and outer shrouds, spaced vanes between the shrouds each curved in a direction extending from one shroud to the other having a streamline contour and a graduated thickness increasing from the inner shroud to the outer shroud providing a low lift at the inner shroud and a high lift at the outer shroud, and a constant pitch angle.

3. In a fluid transmission of the type having a toroidal channel, wheels each including inner and outer shrouds, fluid energizing vanes between the inner and outer shrouds of one of the wheels, and vanes for receiving energy from the fluid between the inner and outer shrouds of the other wheels, each of the vanes having a streamline contour and a graduated thickness from the inner to the outer shroud providing a low lift adjacent its inner shroud and high lift adjacent its outer shroud, and a constant pitch angle.

4. In a fluid transmission of the type having a toroidal channel of uniform cross-sectional area, wheels each including inner and outer shrouds, fluid energizing vanes between the inner and outer shrouds of one of the wheels, and vanes for receiving energy from the fluid between the inner and outer shrouds of the other wheels, each of the vanes having a streamline contour and a graduated thickness from the inner to the outer shroud providing a low lift at its inner shroud and high lift at its outer shroud, and a constant pitch angle whereby uniform fluid flow throughout the channel is attained.

5. In a fluid transmission of the type having a toroidal channel of uniform cross-sectional area, wheels each including inner and outer shrouds providing in part the inner and outer walls of the channel, fluid energizing vanes between the shrouds of one of the wheels, and vanes for receiving energy from the fluid between the shrouds of each of the other wheels, said vanes each having a streamline contour and a graduated thickness from the inner to the outer shroud providing a varying lift gradually increasing from its inner shroud to its outer shroud, and a constant pitch angle.

RAYMOND J. MILLER.

REFERENCES CITED

The following references are of record in the file of this patent:

UNITED STATES PATENTS

| Number | Name | Date |
|---|---|---|
| 2,306,758 | Schneider | Dec. 29, 1942 |
| 2,304,721 | Werther | Dec. 8, 1942 |
| 2,306,639 | Miller | Dec. 29, 1942 |
| 2,351,517 | Jandasek | June 13, 1944 |